Patented June 10, 1930

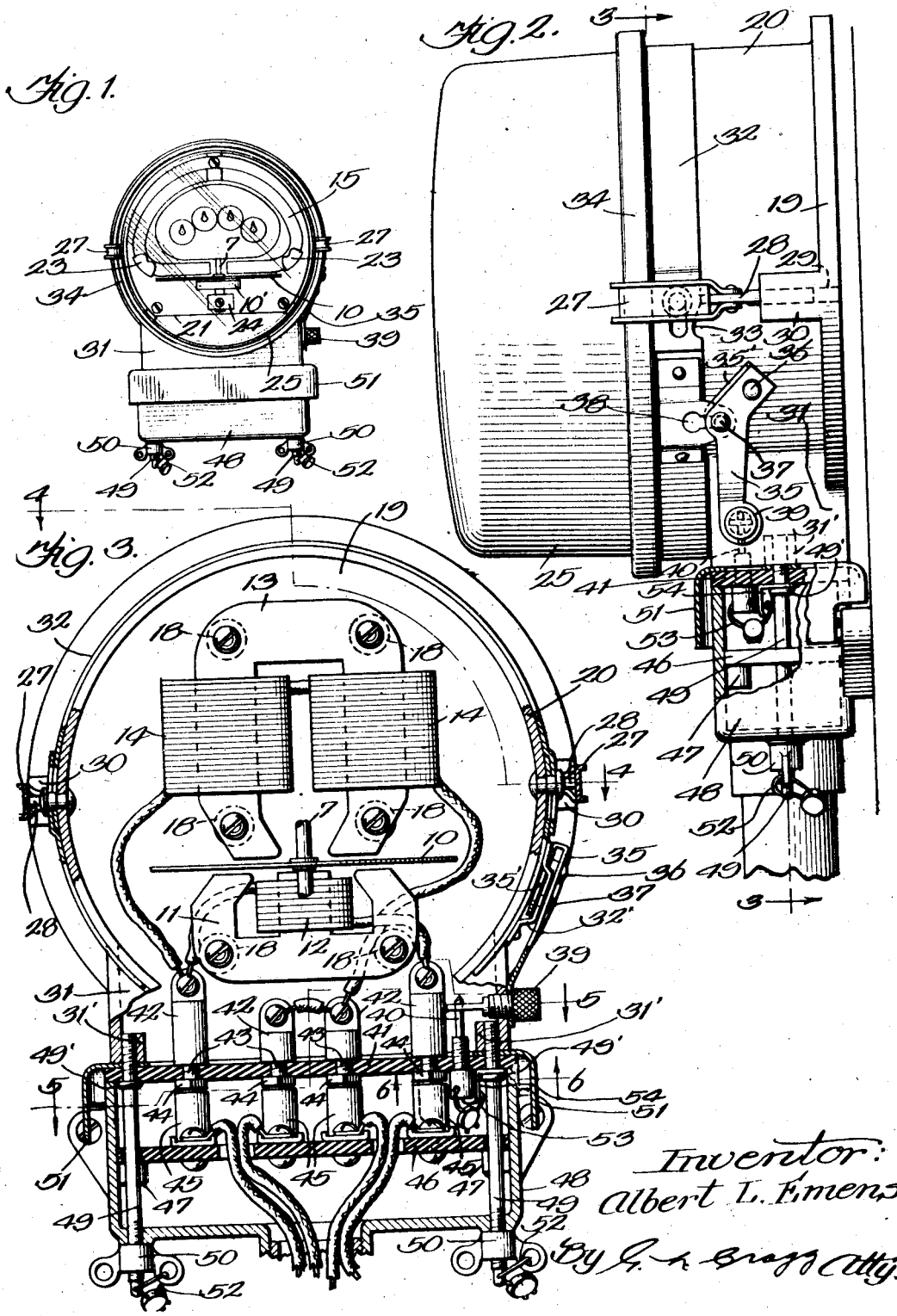

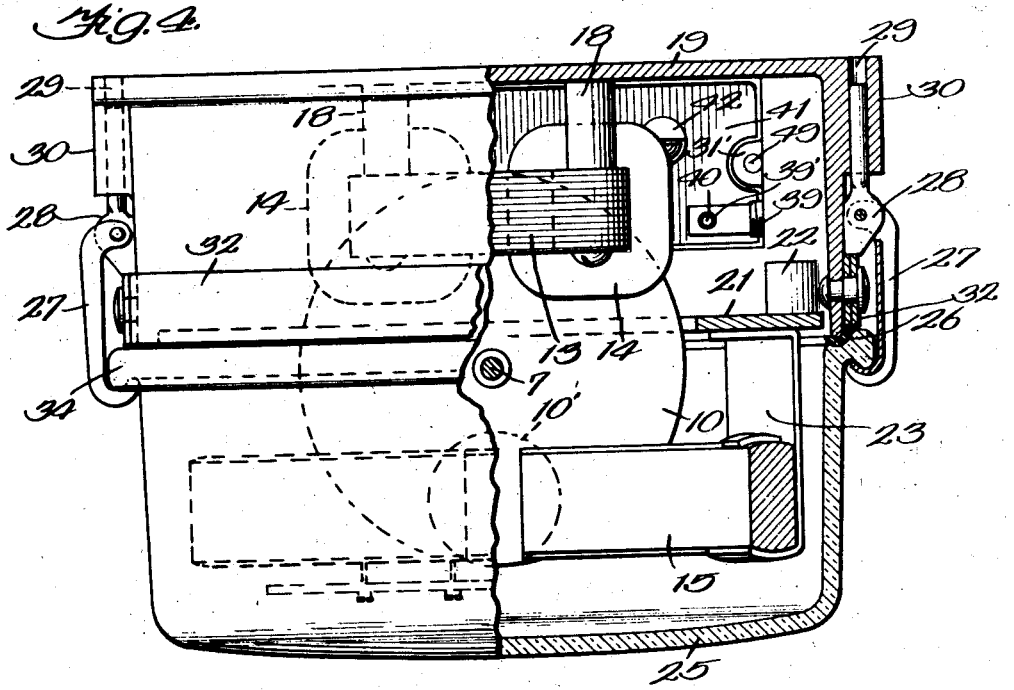

1,762,218

UNITED STATES PATENT OFFICE

ALBERT L. EMENS, OF LA FAYETTE, INDIANA, ASSIGNOR TO DUNCAN ELECTRIC MANUFACTURING COMPANY, OF LA FAYETTE, INDIANA, A CORPORATION OF ILLINOIS

ELECTRICITY METER

Application filed January 11, 1929. Serial No. 331,731.

My invention relates to electricity meters and has as one of its objects the provision of improved means for latching the body and cover portions of a meter casing in assembly; as another of its objects the provision of improved means for preventing the undetectable separation of the service connection box from the body portions of the meter casing; and as a third object the provision of means for guarding the service connection box from access of moisture thereto where it is applied to the body portion of the casing.

In carrying out the first object of my invention I employ a latching hook in swinging and sliding connection with one of the two aforesaid elements of the casing, preferably the body portion of the casing, and means for holding said latching hook in securing engagement with the other element of the casing, the cover. The latch hook is preferably mounted opposite its hook end upon a bolt which is received within a bore that is provided upon the casing element on which the hook is carried. A cam device is also desirably mounted upon this casing element and has actuating engagement with said bolt to force its bodily longitudinal movement when the hook is in position to be applied and permits the reverse movement of the bolt when the hook is to be released from holding engagement. There are desirably two latching hooks which are thus assembled with the body of the casing. There are two cam devices one individual to each hook structure, these cam devices being desirably provided upon a ring or band which surrounds the body portion of the casing and which in being turned in one direction in a plane perpendicular to the axis of the casing will force the application of the hooks to the cover, reverse movement of the ring permitting release of the hooks. The ring is provided with an actuating lever for shifting it to its alternative positions, this lever being formed to enable it to be held in the position it occupies when it moves the ring to bring the hooks into holding position. Sealing means are desirably provided for preventing the undetectable shifting of the actuating lever from the position in which it is placed to cause the application of the hooks to the meter cover.

In carrying out the second object of my invention the means which are employed for holding the ring actuating lever or device in cover securing position is inclusive of a pin which is screwed into the casing and projects into the interior thereof and into engagement with a formation carried by the service connection box and which formation serves to prevent the turning of the pin. The aforesaid formation is preferably also a pin which is screwed through the top wall of the service connection box, there being sealing means for preventing effective unscrewing movement of this latter pin. When these two pins are in inter-engagement the pin that holds the lever cannot be withdrawn without disrupting the sealing means. While this feature of my invention is desirably employed in connection with the ring operating lever, it is not to be thus limited, it being within the scope of my invention to employ the aforesaid pins in conjunction with any means which is employed to hold the cover securing means in functioning position.

In carrying out the third object of the invention I employ a skirted cap whose end wall is clamped between the top wall of the service connection box and the body of the meter casing, the skirt of the cap surrounding the upper portion of the service connection box to prevent the access of moisture between the adjacent surfaces of this box and the body of the meter casing.

The invention will be more fully explained in connection with the accompanying drawing in which Fig. 1 is a front view on a small scale illustrating an electricity meter equipped in accordance with my invention; Fig. 2 is a side view of the meter shown in Fig. 1 with parts in section; Fig. 3 is a sectional view on line 3—3 of Fig. 2; Fig. 4 is a sectional view on line 4—4 of Fig. 3; Fig. 5 is a sectional view on line 5—5 of Fig. 3; Fig. 6 is a sectional view on line 6—6 of Fig. 3; Fig. 7 is a side view showing parts of the structure as they appear in Fig. 2 but with the latching ring and associated parts in different positions; and Fig. 8 shows parts of the structure appearing in Fig. 4 in changed positions.

The meter illustrated is an induction watthour meter. This meter is inclusive of an upright spindle or shaft 7 suitably held in bearings at its ends. A horizontal aluminum armature disc 10 is carried by the spindle on which the disc is rigidly secured. This disc is turned proportionately to the energy consumed by the load by a magnet system that is inclusive of a current or series magnet and a pressure or shunt magnet. The current magnet is inclusive of an E shaped core of laminated iron 11 whose middle leg is wound by a coil 12 serially included in one load circuit side. The pressure magnet is inclusive of a U shaped laminated iron core 13 whose legs are surrounded by the coils 14 which are connected in series in the same bridge between the load circuit sides. The speed of the armature of the meter is checked by the damping permanent magnet 15 which is upon one side of the disc 10, a keeper 10' being upon the other side of the disc. The meter parts illustrated and described constitute a meter motor whose armature 10 and spindle 7 turn proportionately to the wattage in a manner well known to those familiar with the art.

The cores of the current and pressure magnets are carried by posts 18 which, in turn, are carried by the upright back wall 19 of the meter casing. The arcuate wall 20 of the meter casing body projects forwardly from the meter back 19 and surrounds the magnets. This casing body is desirably formed of cast iron. An upright plate 21, of iron, constitutes a magnetic shield which is interposed between the magnet system and the damping magnet. This plate is mounted upon ears 22 that are desirably integrally cast with the meter casing body and are contained within such body. Said plate is nearly coplanar with the front edge of the meter casing. A clip structure, of which a portion 23 is shown, is carried by and upon the front face of the plate 21 and carries the damping magnet 15 in front of said plate. A post 24 is carried by and projects forwardly from the plate 21 and carries the keeper 10'. A cover 25, preferably of glass, is of cup shape, the rim of the cup being carried upon the front edge of the meter casing body, there being a packing 26 which is clamped between the cover and casing body. The means illustrated for clamping the cover in place is inclusive of two diametrically opposite latching hooks 27. Each of these hooks is swingingly mounted upon the head of a bolt 28. The stems of these bolts are slidingly received in bores 29 that extend along the axis of the meter and are provided in ears 30 that are cast integrally with the body portion of the meter casing. The heads of said bolts are forwardly projected beyond the places of attachment of the latching hooks with the bolts. The body of the casing is desirably completely circular at the extreme front end thereof that projects forwardly beyond the rectangular continuation 31 of the casing body. This circular portion of the meter casing body is surrounded by a ring 32 that may turn upon this circular portion of the casing. The ring carries two cam portions 33, each bolt having one of these cam portions individual thereto. When the ring is turned in one direction the cam portions engage the bolt heads and force the rearward movement of the bolts and a consequent rearward movement of the hooks 27 to cause the cover engaging ends of these hooks to grip the annular rib 34 of the cover 25, Figs. 2 and 4, whereby the cover is firmly clamped against the packing 26 and said packing is firmly clamped against the front rim of the meter casing body. Means for placing the ring 32 in its alternative positions is inclusive of a lever 35 which is pivoted, at one end 36, upon the meter casing body and which carries an actuating pin or projection 37 at an intermediate portion thereof. This pin or projection desirably has one end carried directly upon an intermediate portion of the lever 35 and its other end directly carried upon a returned portion 35' of said lever. The shank of the pin passes through the keyhole slot 38 which is formed through the outwardly bulged enlargement 32' of the ring 32. When the lever 35 is turned clockwise the ring 32 is turned counterclockwise to free the bolts 28 from the influence of the cams 33, the latch hooks 27 being then releasable from engagement with the cover rib 34, Figs. 7 and 8. When the lever 35 is turned in a counterclockwise direction the ring 32 is turned in a clockwise direction to force the cams 33 into engagement with the bolts 28, said bolts being thereby forced rearwardly together with the latch hooks 27 that are then forced into holding engagement with the cover rib 34, Figs. 2 and 4. The lever 35 is maintained in its latch applying position by means of a pin 39 whose shank is screwed into and through one wall of the casing continuation 31 and whose head is clamped against the outer end of said lever through which the pin shank also passes. Withdrawal of the clamping pin 39 is prevented by the inner end of the holding pin 40 which is screwed into and through the terminal block 41 that constitutes the closure for the opening in the bottom of the casing continuation 31. The pin 40 is desirably passed through an opening 39' in the inner end of the shank of the screw 39, turning of this screw being thus effectively prevented. As will later appear sealing means are provided to guard against the undetectable withdrawal of the pin 40 from holding engagement with the pin 39.

The terminal block 41 formed of insulation carries the four meter terminals 42 that are contained in the meter casing. Contact pins 43 are screwed into the terminals 42. These contact pins have polygonal flanges 44. The terminal block 41 is clamped between the terminals 42 and the flanges 44 and said terminals are, consequently, mounted upon the upper side of said terminal blocks. The pins 43 are received within the contact sleeves 45 with which the line and load circuit sides are connected as is well understood by those familiar with the art. The contact sleeves 45 are mounted upon a terminal block 46, also formed of insulation. The terminal block 46 is mounted upon the ears 47 that are cast integrally with and within the service connection box 48. The terminal block 41 is clamped against the rim that surrounds the open upper end of the service connection box by means of the clamping bolts 49 that are screwed into the ears 31' that are cast integrally upon and within the casing continuation 31. Said clamping bolts are formed with shoulders 49' which have direct clamping engagement with the block 41. Said bolts are also provided with wing nuts 50 which are screwed upon their outer ends and force the service connection box 48 against the terminal block 41. A skirted cap 51 has its end wall clamped between the terminal block 41 and the bottom edge of the meter casing continuation 31. This cap end wall is formed with a large opening to permit of the clear passage of the meter terminals 42 from the terminal block 41 into the interior of the meter casing. The skirt of said cap surrounds the terminal block 41 and the top rim of the service connection box and desirably extends a considerable distance below said terminal block, whereby access of moisture to the service connection box at the upper end of this box is guarded against.

Undetectable access to the interior of the service connection box is prevented by means of the sealed wires 52 which are passed through openings that are formed in the wing nuts 50 and the outer ends of the bolts 49. So long as said sealing wires are unbroken the interengagement of the pins 39 and 40 remains intact. If the service connection box is removed the undetectable removal of the pin 40 is still guarded against by the sealing wire 53 which is passed through the head of the pin 40, that is below the terminal block 41, and through a clip 54 that is clamped between the terminal block 41 and the shoulder 49' of the adjacent clamping bolt 49. The sealing wires 52 and 53, in cooperation with the pin 40, thus effectively guard the pin 39 from undetectable removal from its effective position in which it holds the lever 35 in a position in which this lever functions, indirectly, to hold the meter cover in place. Claims relating to the skirted cap which is in protecting relation to the service connection box are contained in my copending application Serial No. 383,671, filed Aug. 5, 1929, a division of the present application.

Changes may be made without departing from the invention.

Having thus described my invention, I claim:

1. The combination with a casing for an electricity meter having body and cover portions; of a latching hook swingingly mounted upon one of these casing portions and bodily movable with respect to this casing portion where thus mounted; and means provided upon the latter aforesaid casing portion for effecting bodily movement of the latching hook and the holding engagement of this latching hook with the other casing portion.

2. The combination with a casing for an electricity meter having body and cover portions; of a bolt slidably mounted upon one of the aforesaid casing portions; a latching hook swingingly mounted upon said bolt; and means provided upon the latter aforesaid casing portion for effecting bodily movement of the bolt and, consequently, of the latching hook to effect the holding engagement of said latching hook with the other casing portion.

3. The structure of claim 2 wherein the means for moving the bolt is in the form of a cam.

4. The structure of claim 2 wherein the means for moving the bolt is in the form of a ring surrounding and movable with respect to the meter casing portion that carries the bolt and which ring has a cam formation engageable with the bolt.

5. The structure of claim 2 wherein the means for moving the bolt is in the form of a ring surrounding and movable with respect to the meter casing portion that carries the bolt and which ring has a cam formation engageable with the bolt, and wherein a lever is mounted upon the meter casing portion that carries the bolt and which lever has actuating relation with the ring.

6. The combination with a casing for an electricity meter having body and cover portions; of mechanism carried by one of the aforesaid meter casing portions and engageable with the other meter casing portion for holding these two casing portions in assembly; a positioning pin for holding said mechanism in its functioning position; a shiftable element in holding engagement with said positioning pin; and a sealing device for preventing undetectable effective shifting of said shiftable element.

7. The structure of claim 6 wherein the shiftable element is in the form of a pin and this pin and the other pin are screwed into position.

In witness whereof, I hereunto subscribe my name.

ALBERT L. EMENS.